United States Patent

Williams et al.

Patent Number: 5,585,605
Date of Patent: Dec. 17, 1996

[54] OPTICAL-SCANNING SYSTEM EMPLOYING LASER AND LASER SAFETY CONTROL

[75] Inventors: Guy L. Williams, Yamhill; Timothy A. Jenness, Beaverton; Scott E. Wilson, Sherwood, all of Oreg.

[73] Assignee: Microfield Graphics, Inc., Beaverton, Oreg.

[21] Appl. No.: 148,660

[22] Filed: Nov. 5, 1993

[51] Int. Cl.⁶ .............................. G08C 21/00; G09G 3/02
[52] U.S. Cl. .............................. 178/18; 178/19; 345/173; 345/175; 345/178; 345/179; 345/182
[58] Field of Search ..................... 178/18, 19; 345/173, 345/175, 178, 179, 182

[56] References Cited

U.S. PATENT DOCUMENTS

| | | |
|---|---|---|
| Re. 33,936 | 5/1992 | Miyamori et al. . |
| 3,184,847 | 5/1965 | Rosen . |
| 3,457,646 | 7/1969 | Schwemin . |
| 3,543,240 | 11/1970 | Miller et al. . |
| 3,553,680 | 1/1971 | Cooreman . |
| 3,609,237 | 9/1971 | Gerber . |
| 3,613,066 | 10/1971 | Cooreman . |
| 3,709,602 | 1/1973 | Satomi . |
| 3,733,979 | 5/1973 | England . |
| 3,752,558 | 8/1973 | Lloyd . |
| 3,775,560 | 11/1973 | Ebeling et al. . |
| 3,783,445 | 1/1974 | Penwarden . |
| 3,818,133 | 6/1974 | Cotter . |
| 3,873,770 | 3/1975 | Ioannou . |
| 3,898,445 | 8/1975 | MacLeod et al. . |
| 3,944,740 | 3/1976 | Murase et al. . |
| 3,995,166 | 11/1976 | Hobart ......................... 250/566 |
| 4,078,151 | 3/1978 | McNeary et al. . |
| 4,104,617 | 8/1978 | Bean et al. . |
| 4,125,743 | 11/1978 | O'Boyle et al. . |
| 4,181,952 | 1/1980 | Casey et al. . |
| 4,198,623 | 4/1980 | Misek et al. . |
| 4,205,304 | 5/1980 | Moore . |
| 4,206,314 | 6/1980 | Prugh et al. . |
| 4,213,005 | 7/1980 | Cameron . |
| 4,221,483 | 9/1980 | Rando ......................... 356/250 |
| 4,227,044 | 10/1980 | Fencl . |
| 4,237,617 | 12/1980 | Goussios . |
| 4,277,783 | 7/1981 | Sampieri et al. . |
| 4,294,543 | 10/1981 | Apple et al. . |
| 4,317,956 | 3/1982 | Torok et al. . |
| 4,318,096 | 3/1982 | Thornburg et al. . |

(List continued on next page.)

FOREIGN PATENT DOCUMENTS 1575420 9/1980 United Kingdom .

OTHER PUBLICATIONS

Optical Devices: Lasers; National Aeronautics and Space Administration.
Polyvision; manufactured by Polytronix, Inc.
Pinpointing Coordinates with Laser Beam Scanning; Position feedback opens up applications from the classroom to the surgical suite; by Gerald F. Marshall, Jagmohan S. Gadhok and John L. Junkins.
Electronic Blackboard Technology; Manufactured by Digital Scanning Systems.

*Primary Examiner*—Wellington Chin
*Assistant Examiner*—Vijay Shankar
*Attorney, Agent, or Firm*—Kolisch, Hartwell, Dickinson, McCormack & Heuser

[57] ABSTRACT

An optical-scanning system including a laser, a multi-faceted, rotational scanning mirror, and system-monitoring laser safety structure operatively and informationally connected respectively to the laser and to the mirror and the drive motor for the mirror for altering the effective power output of the laser in response to current operational status of the system as determined by current operational status of the rotating mirror. The safety structure enforces on the laser a duty cycle of operation which is less than 100-percent, causes the laser to power down to a low "sleep" operating level at times other than during a normal scanning sweep, de-powers the laser entirely if either the drive motor for the mirror is not enabled or the rotational speed of the mirror is below full normal operating speed, and also positively de-powers the laser when a user shuts down the system.

5 Claims, 2 Drawing Sheets

U.S. PATENT DOCUMENTS

| | | |
|---|---|---|
| 4,342,910 | 8/1982 | Pfeifer et al. . |
| 4,345,313 | 8/1982 | Knox . |
| 4,380,076 | 4/1983 | Bethune . |
| 4,386,346 | 5/1983 | Levine . |
| 4,501,931 | 2/1985 | Ohya et al. . |
| 4,504,910 | 3/1985 | Araki et al. . |
| 4,553,842 | 11/1985 | Griffin . |
| 4,558,313 | 12/1985 | Garwin et al. . |
| 4,568,182 | 2/1986 | Modjallal . |
| 4,642,422 | 2/1987 | Garwin et al. . |
| 4,670,751 | 6/1987 | Enokido et al. . |
| 4,688,900 | 8/1987 | Doane et al. . |
| 4,711,977 | 12/1987 | Miyamori et al. . |
| 4,772,763 | 9/1988 | Garwin et al. . |
| 4,777,329 | 10/1988 | Mallicoat . |
| 4,786,891 | 11/1988 | Ueda et al. . |
| 4,812,940 | 3/1989 | Takenaga . |
| 4,832,144 | | |
| | 5/1989 | Murakami et al. . |
| 4,901,073 | 2/1990 | Kibrick . |
| 4,938,570 | 7/1990 | Majima ............... 178/18 |
| 4,944,576 | 7/1990 | Lacker et al. . |
| 4,994,204 | 2/1991 | Doane et al. . |
| 4,998,105 | 3/1991 | Takekoshi et al. . |
| 5,009,044 | 4/1991 | Baughman et al. . |
| 5,015,057 | 5/1991 | Rumbaugh et al. . |
| 5,023,408 | 6/1991 | Murakami et al. . |
| 5,023,818 | 6/1991 | Wittensoldner ............... 235/470 |
| 5,073,954 | 12/1991 | Van Tyne et al. . |
| 5,076,690 | 12/1991 | deVos et al. . |
| 5,096,282 | 3/1992 | Margerum et al. . |
| 5,103,080 | 4/1992 | Barkan . |
| 5,121,449 | 6/1992 | Shiba et al. . |
| 5,130,795 | 7/1992 | Rusche et al. . |
| 5,137,354 | 8/1992 | deVos et al. . |
| 5,235,363 | 8/1993 | Vogeley ............... 345/187 |
| 5,248,856 | 9/1993 | Mallicoat ............... 178/18 |

OPTICAL-SCANNING SYSTEM EMPLOYING LASER AND LASER SAFETY CONTROL

TECHNICAL FIELD

This invention relates to an optical-scanning system, and more particularly, to such a system which employs a laser whose beam is scanned, and control circuitry which monitors system operation to maximize laser safety vis-a-vis the eyes of a user of, or someone in proximity to, the system. While the system of the invention has, as will be appreciated by those skilled in the art, relatively widespread utility, an arena in which it has been found to offer particular, immediate utility is that of a graphic data-acquisition system for tracking and assessing the operational status, relatively to a writing surface area, of a write-effective component, such as a pen and an eraser. Because of this situation, a preferred embodiment of the invention is described herein in conjunction with such a graphic system.

BACKGROUND AND SUMMARY OF THE INVENTION

U.S. Pat. No. 5,248,856 for CODE-BASED, ELECTRO-MAGNETIC-FIELD-RESPONSIVE GRAPHIC DATA-ACQUISITION SYSTEM by Mallicoat, issued Sep. 28, 1993, describes a graphic data-acquisition system with respect to which the system of the present invention is an improvement, and is incorporated in this disclosure for illustration purposes. Accordingly, the full disclosure of that patent is hereby incorporated by reference into this disclosure.

That patented data-acquisition system takes the form of a code-based, electromagnetic-field-responsive (and preferably optically responsive) system employing an active pair of transceivers, each including a rotating, multi-faceted scanning mirror and a laser which is thereby scanned across a writing-surface area for the purpose of tracking the position of, and noting certain characteristics respecting, different write-effective components, such as those just mentioned above. While it is very unlikely that someone using, or located near, this kind of a system would ever be in a position to have the beam from a laser in the system directly strike the eye, there is some remote possibility that this could occur. Given this even remote possibility, there is a need for attention, addressed by the present invention, to assure that the system includes certain internal monitoring safety features that will minimize the likelihood of such an occurrence either occurring, or, if occurring, producing any appreciable damage. The system of the present invention, accordingly, and pursuant to a key object of the invention, addresses itself to several concerns relating to imagined situations where laser beam/eye interaction could occur, and focuses on providing internal monitoring and control structures and substructures which reduce, as much as possible, the likelihood of a catastrophic eye/laser-beam encounter.

In particular, when a graphic, data-acquisition system of this type is in normal operation, a laser beam typically is scanned in successive scanning sweeps through a scanning zone which is located near a writing-surface area, and there is some possibility that an object impinged in that zone by the laser beam could reflect outwardly toward the eye of a nearby person. To deal with this possibility, the system of the present invention, inter alia, forces on such a beam what might be thought of as a controlled operating duty cycle, whereby the "effective" power of the beam, during normal operation, is reduced well below the nominal operating power level for the beam. Specifically, the system of the invention utilizes a blanking/un-blanking control "mechanism" and signal, whereby the particular laser involved operates for only a short period of time relative to each revolution of a multifaceted scanner.

Backing this up, and as a further safety measure, the system of the invention incorporates substructure which monitors the blanked or "sleeping" period of time for the laser to assure that if, for some reason, the laser does not shut down to what is referred to herein as a "sleeping" power level, power flow is completely and immediately shut off to the laser and to the scanner.

A further safety consideration taken into account in accordance with the invention is that the laser is not permitted to be powered except under circumstances when (1) the drive motor for the associated scanner is enabled and (2) the associated driven scanner is in fact operating at full scanning speed, or rpm.

Finally, the safety features of the invention include controls whereby when a user of the system gives a command to shut down system operation, power is immediately cut off from the laser.

Thus, in addition to providing positive control over the effective operating power of a scanned laser during normal operation, the system of the present invention monitors other areas of "normal" activity, and disables the laser when a related abnormality appears.

These and other objects and features which are offered and attained by the invention will become more fully apparent as the description which now follows is read in conjunction with the accompanying drawings.

DESCRIPTIONS OF THE DRAWINGS

Figure 3:
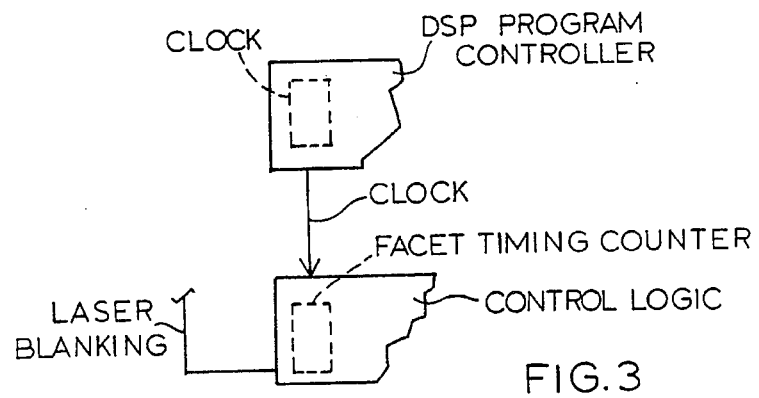
FIG. 3 is a fragmentary, and somewhat augmented, detail of the diagram of FIG. 2 illustrating certain safety-control features.
Figure 4:
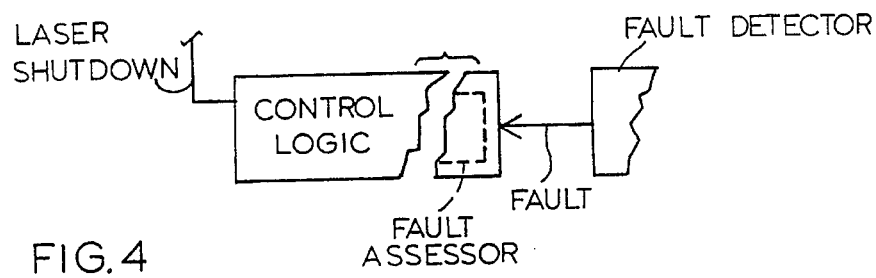

FIG. 4 which is generically like FIG. 3, illustrates certain other safety-control features of the system of the invention.

DETAILED DESCRIPTION OF, AND BEST MODE FOR CARRYING OUT, THE INVENTION

Figure 1:
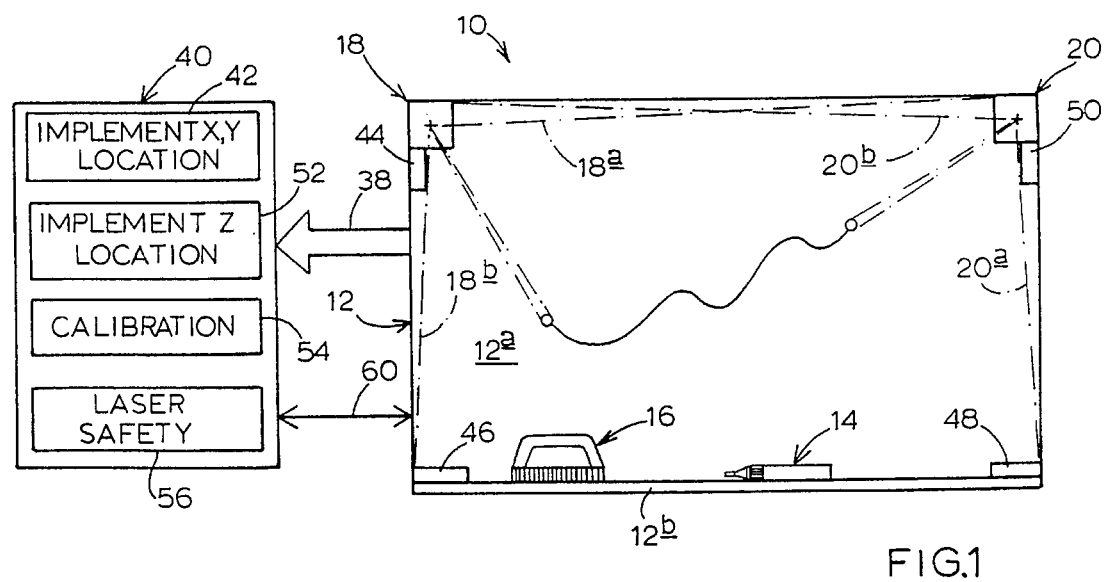
FIG. 1 is a front elevation, in schematic form, illustrating a graphic data-acquisition system including the monitoring safety-feature system of the present invention.

Turning attention now to the drawings, and referring first of all to FIG. 1, indicated generally at 10 is a graphic data-acquisition system including, as will be described, an optical-scanning system constructed with safety features proposed in accordance with the present invention. Associated with this data-acquisition system, as illustrated in FIG. 1, is a writing-surface area 12a of an upright, dry-erase whiteboard 12 which includes an implement-support ledge 12b on which rest two, mobile, write-effective components, including a pen 14 and an eraser 16. Each of these two components is constructed with encoded, retroreflective structure as described in the above-referenced '856 U.S. patent.

Located at two, spaced stations adjacent the upper corners of board 12 are two, active transceiver structures 18, 20 which are alike in construction, and which are formed of components and circuitry that are of conventional and readily available commercial design. Each of these transceiver structures includes a laser, also referred to herein as a light-beam source, a five-facet (equilaterally pentagonal) power-rotated scanning mirror, also referred to herein as a rotational scanning instrumentality, appropriate optics associated with the laser, and circuitry which, inter alia, monitors the onness and offness (power level) of the laser, as well as the current rotational speed of the scanning mirror. Output signals relative to these two matters is made available from this circuitry, and is used, as will be explained, in the implementation of the present invention.

As is explained in the '856 patent, structure 18 functions to create, over and closely adjacent writing-surface area 12a, a pattern of scanned radiation in a scanning zone which is partially bounded by dash-dot lines 18a, 18b. Scanning occurs by structure 18 in successive sweeps in a counter-clockwise, rotary direction in FIG. 1. As the '856 patent points out, certain substructure within transceiver structure 18 responds to any return-response radiation that returns from a designated reflecting object within the scanning zone to effect a datastream which is interpretable to track the position and to note the character of a write-effective component disposed in proximity to writing-surface area 12a. Structure 20 operates in a similar fashion to contribute to the scanning zone a pattern of clockwise-scanned light lying between dash-dot lines 20a, 20b. The scanning rate associated with transceiver structure 20 is the same as that associated with structure 18, and herein is 83 scans-per-second.

The tracking-interpretable datastreams from structures 18, 20 are fed via data bus 38 to a processing unit 40 which includes a unit portion 42 labeled herein "IMPLEMENT X, Y LOCATION" that operates in accordance with the descriptive material provided in the '856 patent regarding a processor (40) shown in that patent.

Further incorporated with system 10 in accordance with improvements thereto described not only in this specification, but also described in three, pending, companion patent applications, identified hereinafter, are special reflector structures 44, 46, 48, 50, positioned as shown adjacent the margins of writing-surface area 12a, and within processing unit 40, processing unit portions 52, 54, 56, labeled, respectively, "IMPLEMENT Z LOCATION", "CALIBRATION", and "LASER SAFETY". Unit portion 56 embodies the bulk of the system-monitoring laser safety features contributed by the present invention. The three companion patent applications just mentioned are: "MARKING SYSTEM WITH PEN-UP/PEN-DOWN TRACKING", filed Nov. 5, 1993, by Scott E. Wilson, Samuel W. Mallicoat and Donald H. Zurstadt; "CALIBRATION OF GRAPHIC DATA-ACQUISITION TRACKING SYSTEM", filed Nov. 5, 1993, by Donald H. Zurstadt, Samuel W. Mallicoat and Scott E. Wilson; and "GRAPHIC DATA-ACQUISITION SYSTEM UTILIZING LIGHT-SOURCE STRUCTURE WITH EXTRANEOUS-LIGHT FILTERING", filed Nov. 5, 1993, by Timothy A. Jenness and Scott E. Wilson. The entire disclosures of these two companion applications are hereby incorporated herein by reference.

As explained in the patent application titled "CALIBRATION OF GRAPHIC DATA-ACQUISITION TRACKING SYSTEM", structures 44, 46, 48, 50 function to aid in time calculations relative to the scan sweeps of the two laser beams, and in addition, to promote accurate positioning of these scan sweeps relative to the location of writing-surface area 12a. The patent application titled "MARKING SYSTEM WITH PEN-UP/PEN-DOWN TRACKING" relates to and describes unit portion 52 of processing unit 40. The third-mentioned, companion patent application focuses on extraneous-light filter substructure employed in transceiver structures 18, 20.

Figure 2:
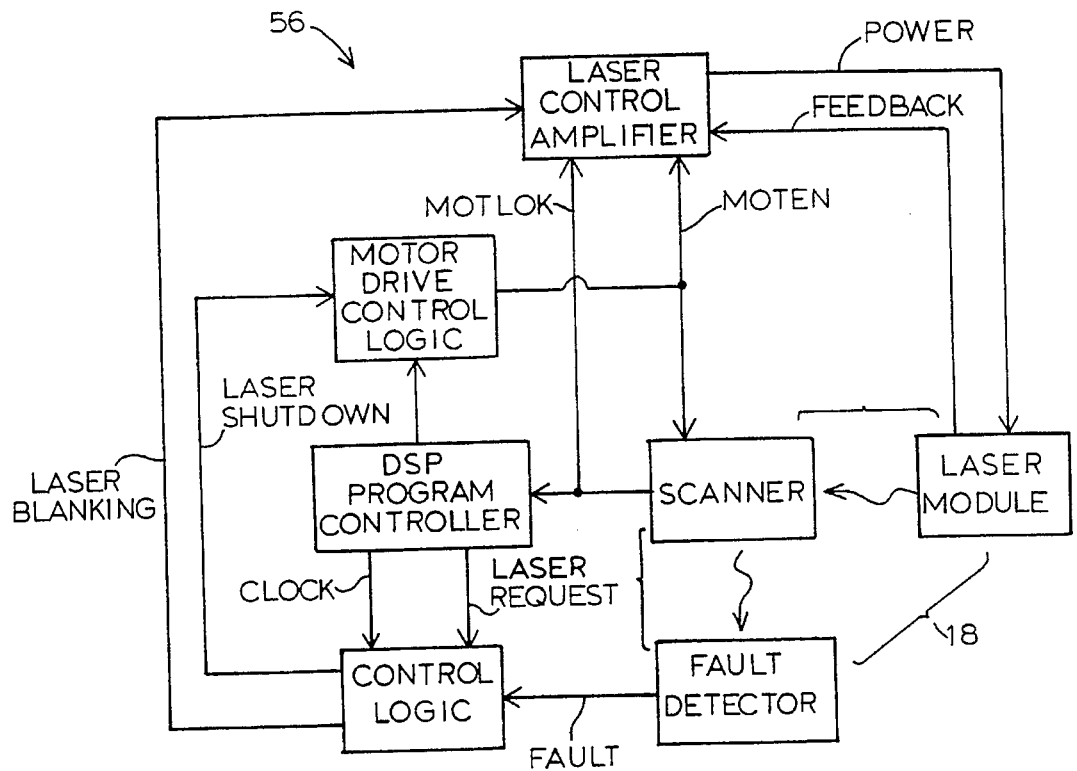
FIG. 2 is a block/schematic diagram of the system of the invention.

Turning attention now to FIG. 2 in the drawings, here the organizational details of laser safety features 56 are set forth in a block/schematic way, and are pictured in association with the relevant component portions of, for example, transceiver structure 18, whose relevant components are embraced by the three brackets which are shown in this drawing figure. Similar association, not shown, exists with transceiver structure 20. Beginning first with these several relevant components of structure 18, included is (1) the laser represented in a block identified as "LASER MODULE", (2) the scanner, represented by a block marked "SCANNER", including the above-mentioned, five-facet, rotating mirror and an associated rotational drive motor, and (3) a laser onness/offness observing diode (or the like) swept by the scanner and contained within a block marked "FAULT DETECTOR".

Other blocks shown in FIG. 2 include a "LASER CONTROL AMPLIFIER", "MOTOR DRIVE CONTROL LOGIC", "DSP PROGRAM CONTROLLER", and "CONTROL LOGIC". These blocks represent a well-understood mix of hardware and software elements, and can internally be constructed in a number of different ways well within the skills of those skilled in the relevant art. Accordingly, internal details of construction, which form no specific part of the present invention, are not presented and discussed herein.

Through a line marked "POWER" the LASER CONTROL AMPLIFIER supplies operating power to the laser in the LASER MODULE, and via a line marked "FEEDBACK", and in accordance with appropriate adjustments made in the LASER CONTROL AMPLIFIER, the nominal operating power level for the laser, which is the power level intended for operation during each scanning sweep, is controlled.

Under the control of the CONTROL LOGIC block, the MOTOR DRIVE CONTROL LOGIC, via conductor structure labeled "MOTEN", both enables and powers the drive motor for the SCANNER, and provides an informational drive-motor enable signal to the LASER CONTROL AMPLIFIER. The SCANNER, via conductor structure labeled "MOTLOK", informs the DSP PROGRAM CONTROLLER, as well as the LASER CONTROL AMPLIFIER, when the scanning mirror structure is actually operating at the desired, full rotational speed for operation in the system. Among other things, before the LASER CONTROL AMPLIFIER will supply power to the LASER MODULE, it must have available to it both a drive-motor enable (MOTEN) signal from the MOTOR DRIVE CONTROL LOGIC, and a MOTLOK signal from the SCANNER. Conductor structures MOTEN and MOTLOK, along with respectively associated circuitry, function herein as rotational-speed-monitoring and drive-power-enable substructure.

Considering now FIGS. 3 and 4 along with FIG. 2, and considering what is referred to herein as duty-cycle substructure, information provided the DSP PROGRAM CONTROLLER via the MOTLOK conductor structure is assessed in relation to a system CLOCK, shown in dash-dot lines in FIG. 3. This "related" information is provided to the CONTROL LOGIC block, via a conductor marked "CLOCK", in which logic block a dashed block marked "FACET TIMING COUNTER" works in accordance with one of the features of the present invention to enforce an operating duty cycle on the laser via a control conductor marked "LASER BLANKING" which feeds a signal to the LASER CONTROL AMPLIFIER. In accordance with the preferred embodiment of the invention which is now being described, it is intended that the laser in structure 18 be energized at the selected normal operating level only once during the "passage" of one of the five rotating facets during each revolution of the scanning mirror, and specifically so that the beam only operates long enough to implement a scan, during "passage" of that one facet, essentially between previously mentioned lines 18a, 18b shown in FIG. 1. During the remaining portion of each revolution of the scanning mirror, i.e., during the "passages" of the other, four, successive mirror facets, the CONTROL LOGIC block supplies a LASER BLANKING signal to the LASER CONTROL AMPLIFIER, which results in this amplifier dropping the operating power level of the laser from the normal operating level to a much lower level, which is referred to herein as a "sleep" level. This sleep level is chosen so that even if, for some reason, the laser beam were to strike a person's eye, and even for an extended time period, no appreciable eye damage would result. However, and as will further be explained, such an extended exposure time is not possible because of other safety features which are implemented in accordance with the invention.

During the "sleep" portion of each operating revolution of the rotating scanning mirror, the FAULT DETECTOR operates to confirm that the laser is in fact operating at the selected "sleep" power level, and if operating power goes above this level, sends a control signal, via a line marked "FAULT", to a FAULT ASSESSOR contained within the CONTROL LOGIC block, which assessor, upon making a fault assessment, causes the CONTROL LOGIC block to send a LASER SHUTDOWN signal to MOTOR DRIVE CONTROL LOGIC via a conductor marked "LASER SHUTDOWN". The FAULT DETECTOR is also referred to herein as sleep-level-observing substructure.

The POWER, FEEDBACK, MOTEN, MOTLOK and FAULT conductor structures extend between system 10 and unit 40 via cable structure shown at 60 in FIG. 1.

Given the system organization which has just been described, let us now "travel through" the important and significant safety features offered in accordance with this invention. During normal scanning operation, each laser is powered only during the passage of one of the five mirror facets during each revolution of the associated rotating mirror. This form of enforced duty-cycle control thus lowers what might be thought of as the "effective" power of a laser to a level which is below that of the nominal normal operating power of the laser. During the passages of the four other scanning facets, i.e., between intended, successive scanning sweeps, if the laser fails to power down to the sleep level under control of the LASER BLANKING signal from the CONTROL LOGIC block, the FAULT DETECTOR produces an appropriate FAULT signal which results in a LASER SHUTDOWN signal being transmitted to the MOTOR DRIVE CONTROL LOGIC block. When this happens, the MOTOR DRIVE CONTROL LOGIC block removes the MOTEN signal, thereby both shutting down the LASER CONTROL AMPLIFIER so that power is cut off from the laser, and stopping motor drive for the SCANNER. When this occurs, and when the SCANNER slows below its assigned operational speed, and redundantly, the MOTLOK signal is removed, and thus the LASER CONTROL AMPLIFIER is further assuredly disabled from powering the laser. Thus, if some failure were to occur which interrupted duty cycle control for the laser, the possibility that the laser beam could be scanned through the scanning zone, and thus potentially be available to strike a person's eye during other than the proper passage of the selected scanning facet, it is substantially reduced to zero.

At any time, such as during start up of the system, when the rotary speed of the SCANNER is below the designated and chosen scanning speed, a MOTLOK signal is denied the LASER CONTROL AMPLIFIER, and the latter is unable to power the laser. This prevents a situation where a slowly swept, and thus longer-lingering, laser beam, could impinge a person's eye.

Whenever the DSP PROGRAM CONTROLLER, via the line marked "LASER REQUEST", calls for energizing of the laser, as if assuming that the proper scanning facet is moving into position, the FACET TIMING COUNTER in the CONTROL LOGIC block, with information coming from the DSP PROGRAM CONTROLLER also, determines whether this request is being placed at an appropriate time, and if it is, allows removal of the LASER BLANKING signal, and if it is not, keeps the blanking signal in place to hold the laser in its "sleep" condition.

Whenever a user shuts down the system, the DSP PROGRAM CONTROLLER, via system-on-following substructure contained within it, so informs the MOTOR DRIVE CONTROL LOGIC which then removes the MOTEN signal. This immediately causes the LASER CONTROL AMPLIFIER to shut down the supply of power to the laser, and further causes the SCANNER to stop operating.

Accordingly, the system of the invention offers significant safety features which substantially eliminate from concern the possibility that someone near the system would experience eye damage. Variations and modifications well within the skill of those skilled in the art may, of course, be made without departing from the spirit of the invention.

We claim:

1. A graphic data-acquisition system for tracking and assessing the operational status of a mobile write-effective component relative to a defined writing-surface area, said system comprising a light-beam source in the form of a laser, a power-operated, rotational scanning instrumentality positioned adjacent said source and operable, with rotation, to scan a beam from the source in successive scanning sweeps through a scanning zone spaced closely adjacent and generally spanning the writing-surface area, and system-monitoring laser safety structure operatively and informationally connected, respectively, to said source and to said instrumentality, operable, in response to the currently understood operational status of said instrumentality, to alter accordingly the effective power output of said source, said structure including duty-cycle substructure which is responsive to information regarding instrumentality angular position to create a power-flow duty cycle for said source which is less than 100-percent, whereby the source is powered at one selected operating level during the time of a scanning sweep, and powered at another, lower, selected sleep level between successive scanning sweeps.

2. The system of claim 1, wherein said structure further includes sleep-level-observing structure operable, under circumstances with the source intended to be powered at sleep level, to stop the flow of power to the source on observing an operating power level above sleep level.

3. The system of claims 1 or 2, wherein said structure contains rotational-speed-monitoring and drive-power-enable substructure which allows the supply of power to said source only under circumstances of both drive-power enablement for, and confirmed attainment of selected, normal, rotational operating speed by, said instrumentality.

4. The system of claims 1 or 2, wherein said structure includes system-on-following substructure operable, on a command being given to remove drive power from said instrumentality, to stop the flow of power to said source.

5. The system of claim 3, wherein said structure includes system-on-following substructure operable, on a command being given to remove drive power from said instrumentality, to stop the flow of power to said source.

* * * * *